April 13, 1954     F. O. RODRIGUEZ     2,674,919
STEREOSCOPIC PROJECTOR AND PROJECTION LENS SYSTEM
Filed Oct. 10, 1951     2 Sheets-Sheet 1
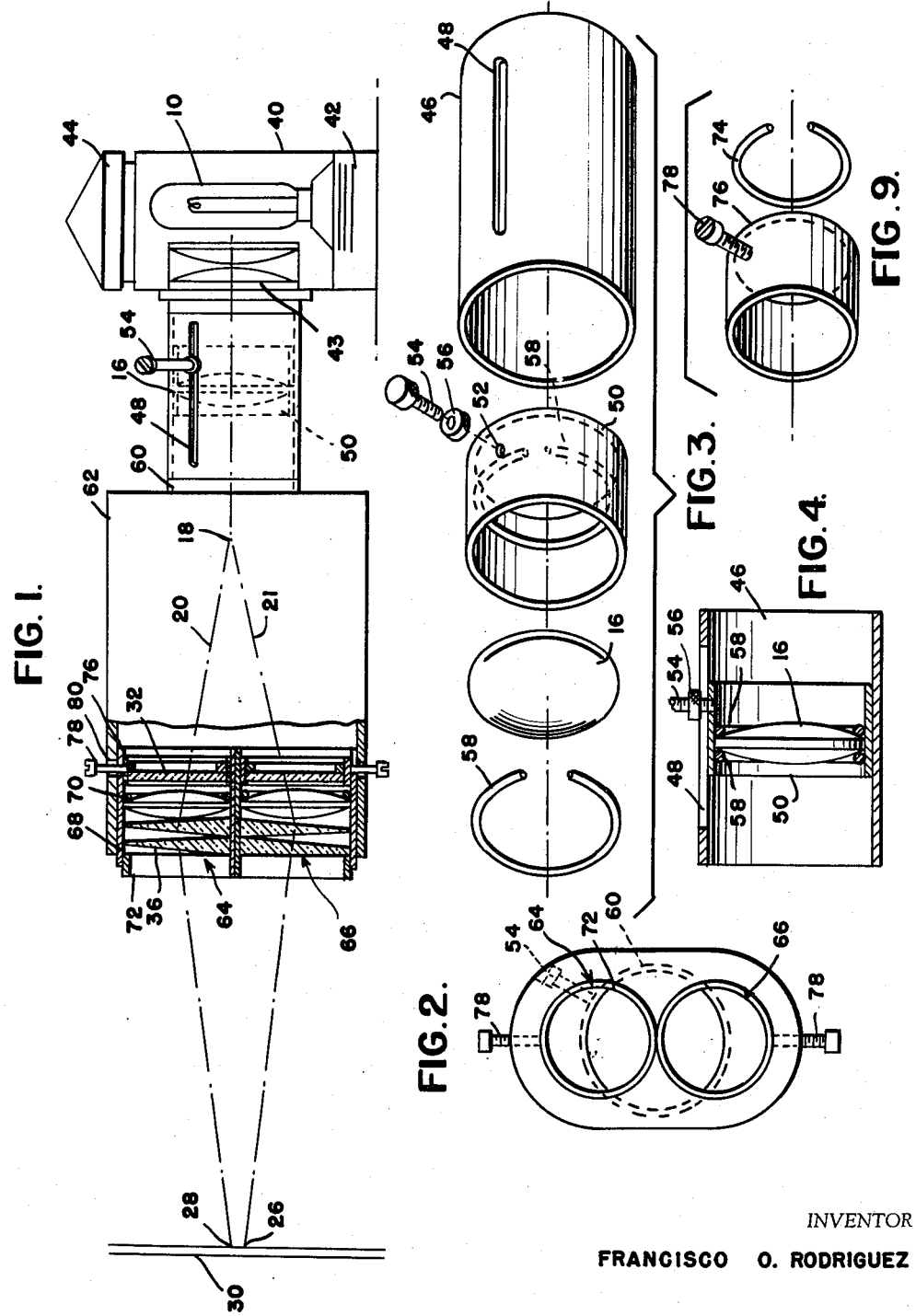
INVENTOR
FRANCISCO O. RODRIGUEZ
BY Wilkinson & Mawhinney
ATTORNEYS

INVENTOR
FRANCISCO O. RODRIGUEZ

BY Wilkinson & Mawhinney
ATTORNEYS

Patented Apr. 13, 1954

2,674,919

UNITED STATES PATENT OFFICE 2,674,919

STEREOSCOPIC PROJECTOR AND PROJECTION LENS SYSTEM

Francisco Oropeza Rodriguez, Mexico City, Mexico

Application October 10, 1951, Serial No. 250,666

4 Claims. (Cl. 88—26)

This invention appertains to improvements in systems for obtaining stereoscopic effects and has for its primary object to provide a novel and simple lens system for securing a double bicolored projection from a single luminous point with the differently colored double images being angularly displaced one from the other on a flat surface or screen and being viewed by an observer through a pair of spectacles having colored glasses related to the colored images.

Another object of this invention is to produce depth effects using a single photograph by providing a system of lenses, prisms and color filters, which are arranged in such a manner and so corelated as to project two images on a screen from the photograph with a suitable relative displacement between the images and the images having different color values, such as red and blue, the images being observed by a spectator having spectacles with red and blue glasses so that one image is seen with one eye and the other with the other eye, the superimposed images, as thus viewed, presenting a third dimensional effect.

A further object of this invention is to provide a lens system that achieves a double projection in two different colors or with light polarizing filters from a single photographic slide or moving picture film, the images being slightly displaced one from the other and the projection being observed through a two-color spectacle or polarized light viewers, which give the effect of three dimensional projection.

A still further object of this invention is to provide means for adjusting the focus of the picture projected on the screen and to provide means for selectively changing from color filters to polarized light filters.

A still further object of this invention is to provide a compact, inexpensive and simply constructed and operated projector, whereby stereoscopic effects can be obtained from a single photograph or moving picture film.

These and other objects and structural features of merit are attained by this invention, the preferred embodiment of which is set forth in the following description and illustrated in the accompanying drawings, wherein:

Fig. 1 is a side elevational view of a projector, constructed in accordance with the principles of this invention, with part of the casing removed to show the lenses and prisms in section;

Fig. 2 is a front elevational view of the projector;

Fig. 3 is an exploded perspective view of the projecting lens structure;

Fig. 4 is a longitudinal vertical sectional view of the projector lens;

Figure 6:
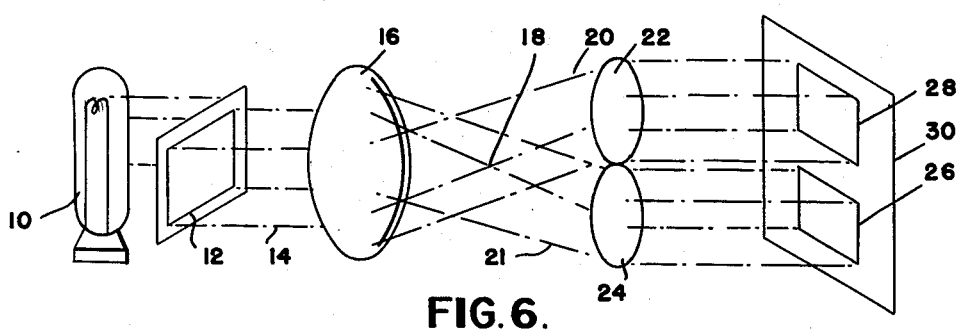
Fig. 6 is a diagrammatic view, illustrating the projection of a single photograph in dual image form.
Figure 7:
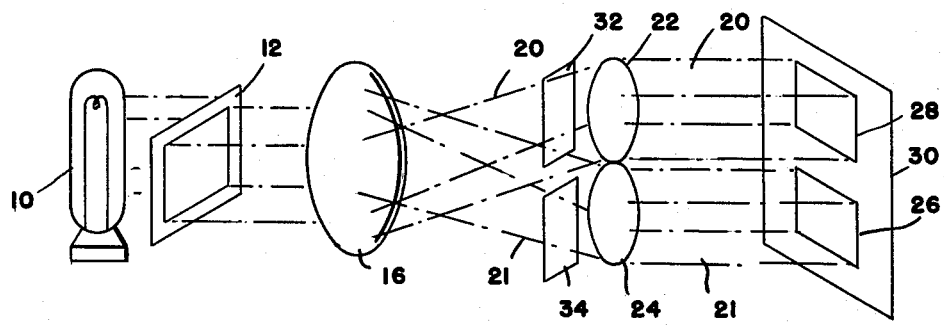
Fig. 7 is a similar view to Fig. 6, with the color filters introduced in the system and interposed in the path of the light rays for the projection lenses.
Figure 8:
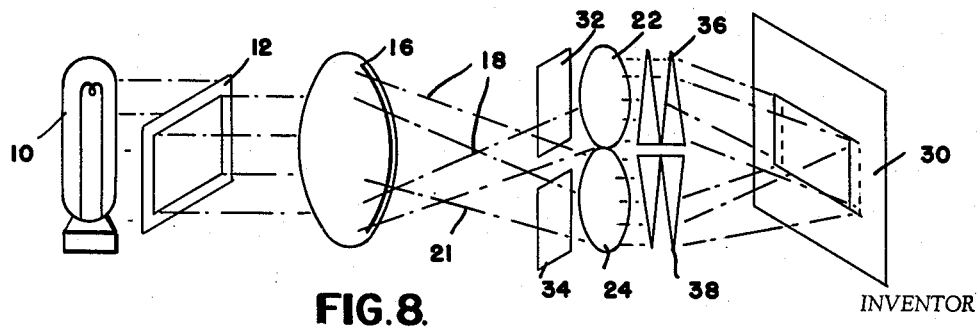
Fig. 8 is a similar diagrammatic view, with the prisms introduced in the system and disposed before the focal point of the lenses so that the light rays are refracted to an angle for required displacement of superimposed effect for relief projection on a screen; and, Fig. 9 is an exploded perspective view of the rotatable housing for the light filters.

Referring now more particularly to the accompanying drawings and initially to Figs. 6 through 8, the lens system is especially designed to obtain a superimposed effect for relief projection, so that a stereoscopic or third dimensional effect is obtained from a single photograph or film strip. Conventionally, two photographs are projected from separate and individual projectors onto a screen or flat surface in a displaced manner, different color values being given each image and the superimposed images being viewed by an observer through colored glasses, having color values related to the color values of the images. Thus, by the method of a double projection in two colors, the images being slightly displaced and being viewed with spectacles of a like color, a stereoscopic effect has been obtained. However, it has been necessary to have two separate photographs taken at a different angle by a stereoscopic camera or by changing the position of another camera to take a second photograph of the same object at a different angle. Thus, it is necessary to have two photographs on a double projector.

It is the aim of the instant invention to provide a stereoscopic projector lens system, wherein a single photograph is employed but the lens system is arranged and correlated in such a manner so that the single photograph is projected on a screen to obtain a relief effect. To accomplish this, two projecting units are provided, the projecting units being adjustable and projecting two images onto a screen in a displaced fashion and with different color values.

As seen in Fig. 6, a light source 10 is provided and is disposed behind a single photograph or film strip 12, so that the light rays 14 pass through the photograph and are intercepted by a biconvex lens 16. The biconvex or focusing lens 16 intercepts the light rays 14 and projects the light rays to a focal point or axis, located at 18. From this focal or concentration point 18, light dispersion begins at diverging paths, that is, it expands in a widening circle similar to light rays reflected from a spotlight or the like. Therefore, the light rays 14 are divided into two separate paths 20 and 21. Obviously, from the focus 18 the rays of picture formed light are divided by means of natural dispersion into many picture formed light rays but only two of the light rays are picked up by two adjustable projection lenses 22 and 24, which are vertically arranged and which intercept the light rays 20 and 21 after the focal point 18, the light rays being transmitted in a horizontal plane.

In Fig. 7, the same arrangement is illustrated, wherein the two images 26 and 28 are projected by the lenses 22 and 24 on a screen 30. In this view, light filters 32 and 34 are illustrated, the light filters being introduced in the system in the path of the light rays before the projection lenses 22 and 24, so that the projected light rays 20 and 21 are given different color values, for example, red and blue.

At this point, it is necessary to bring the light rays 21 and 20 closer together and at an angular relation, so that the images 26 and 28 present a superimposed effect on the screen 30 for relief projection on the screen. This is accomplished, as seen in Fig. 8, by introducing in the system before the focal point of the lenses 22 and 24 dual prisms 36 and 38. The prisms 36 and 38 provide the means for refracting the light rays 20 and 21 to an angle for required displacement of superimposed effect relief projection of the dual images 26 and 28, which are slightly displaced.

The stereoscopic effect is observed by looking at the screen, with the superimposed images projected thereon, through spectacles having glasses of different color values, such as blue glass for one eye and red glass for the other eye. Thus one eye views one image and the other eye views the other image.

As seen in Fig. 1, the lamp 10 is mounted in a lamp housing 40, which is of conventional construction and is provided with the usual vent openings 42 and removable top 44 for replacement of the lamp. The rays of the lamp are directed through a glass slide 44 and are intercepted by the biconvex lens 16. The lens assembly, as seen in Fig. 3, includes an elongated cylindrical casing 46, which is formed with a longitudinally extending slot 48. An inner annular retaining ring or sleeve 50 is slidably disposed in the casing and is formed with a radial opening 52 for receiving the inner end of a set screw 54 which is held therein by a lock nut 56. The lens 16 is positioned within the sleeve 50 by split rings 58, as seen in Fig. 4, and the shank of the set screw is disposed through the slot 48, so that the sleeve 50 can be axially adjusted in the sleeve. It is obvious that for a given position of the screen, the sleeve 50 will permit the adjustment of the focus of the picture projected on the screen by sliding the sleeve, so that the biconvex lens is brought closer to or moved further away from the source of the light.

The casing 46 is secured at its rearward end to the housing 40 and at its forward end to a collar 60, which is formed on the rearward end of a housing 62. The housing 62 is elliptical shaped in cross-section and houses the two projection lens assemblies 64 and 66.

Figure 5:
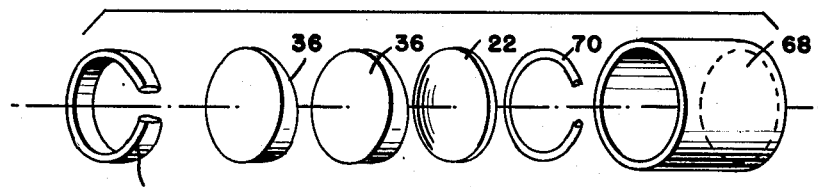
Fig. 5 is an exploded perspective view of the projection lenses and prisms.

Each of the lens assemblies is constructed identically, so that a detailed explanation of only one will be given. In this respect, attention is directed to Figs. 5 and 6.

The lens assembly 64 includes a cylindrical casing 68, within which the lens 22 and the dual prisms 36 are mounted in spaced relation by a split retaining ring 70 and a split collar 72 which projects forwardly of the housing to form a shield. The casing 68 is rotatably mounted in the casing or housing 62 and can be rotated by grasping the collar 72, so that the set of prisms can be readjusted by rotating them on their axis to find a new displacement according to the distance of the casing 62 from the screen. In this respect, it is obvious that for a given position of the prisms, a certain displacement is required depending on the distance from the screen to the luminous point.

The filter 32 is fixedly mounted transversely within a sleeve 76 by a split retaining ring 74. The sleeve 76 is rotatably disposed within the inner end of the casing 68 and is provided with a radially extending set screw 78. The set screw 78 is disposed through a semi-circular slot 80 formed in the wall of the casing 62 so that the sleeve 76 can be rotated independent of the rotation of the casing 68. The rotation of the sleeve is especially of value, when light polarizing filters are used, since in the case of light polarizing filters, the sleeves can be rotated to obtain a desired angle, depending on the distance of the screen 30 to the projecting lens 22 so that the angle of polarization can be adjusted.

In use, a single photograph 12 is disposed in the slide, in advance of the light source 10, and the picture formed light rays are reflected by the biconvex lens 16 to the concentration point 18 and the rays 20 and 21 pass horizontally through the filters and the projection lenses and are bent to the desired angle by the prisms so that the superimposed effect or relief projection is obtained. The bicolored double images are viewed through colored glasses, so that two images are seen, one by one eye and the other by the other eye.

Of course, while the preferred embodiment of this invention has been described and illustrated, it is obvious that other forms can be used and, accordingly, limitation is sought only in accordance with the appended claims.

I claim:

1. An apparatus for obtaining stereoscopic effects in projecting a single flat picture on a flat surface comprising a light source, a biconvex lens intercepting the rays from said source and refracting the rays to a focal point, a pair of axially fixed rotatable open ended casings disposed in side by side relation and positioned forwardly of the biconvex lens and in spacial light unobstructed relation with said lens for receiving the dispersed light rays after the focal point, a projection lens in each casing for transmitting the rays in parallel paths, color filters in each casing disposed rearwardly of each lens and prisms in said casing disposed forwardly of each lens for bending the light rays from the lenses to the desired angle of projection on a screen so that double superimposed images are projected onto the screen and are slightly displaced and at a vertical corresponding plane of projection.

2. An apparatus for obtaining stereoscopic effects in projecting a single flat picture on a flat surface comprising a light source, a biconvex lens intercepting the rays from said source and refracting the rays to a focal point, means for longitudinally adjusting said lens relative to the light source, a pair of projection lenses disposed in side by side relation forwardly of the lens and in spacial light unobstructed relation with the lens to receive the dispersed light rays after the focal point and transmit the rays in parallel paths, filters disposed rearwardly of each lens and prisms in fixed spacial relation with each lens disposed forwardly of each lens for bending the light rays from the lenses to the desired angle of projection on a screen so that double superimposed images are projected onto the screen and are slightly displaced and at a vertical corresponding plane of projection.

3. An apparatus as claimed in claim 2, wherein each projection lens, the filters disposed rearwardly of each lens and prisms disposed forwardly of each lens are mounted in a rotatable axially located casing as a unit.

4. An apparatus as claimed in claim 3, wherein mounting means is provided for mounting the filters in the casings and providing for rotation independent of the casing.

References Cited in the file of this patent

UNITED STATES PATENTS

| Number | Name | Date |
|---|---|---|
| 1,088,412 | Glover | Feb. 24, 1914 |
| 1,863,558 | Holder | June 21, 1932 |
| 1,938,992 | Baker et al. | Dec. 12, 1933 |

FOREIGN PATENTS

| Number | Country | Date |
|---|---|---|
| 160,512 | Great Britain | Mar. 16, 1921 |